United States Patent [19]
Griffin et al.

[11] Patent Number: 5,630,670
[45] Date of Patent: May 20, 1997

[54] AXIAL ROLLING BEARING

[75] Inventors: Joseph T. Griffin; Bobby V. Cathey, Jr., both of Charlotte, N.C.

[73] Assignee: INA Wälzlager Schaeffler KG, Herzogenaurach, Germany

[21] Appl. No.: 617,971

[22] Filed: Mar. 19, 1996

[30] Foreign Application Priority Data

Jun. 3, 1995 [DE] Germany ................ 195 20 483.2

[51] Int. Cl.$^6$ ................ F16C 33/66; F16C 19/30
[52] U.S. Cl. ................ 384/606; 384/470; 384/623
[58] Field of Search .............. 384/470, 606, 384/623, 620, 621

[56] References Cited

U.S. PATENT DOCUMENTS

| | | |
|---|---|---|
| 1,913,275 | 6/1933 | Herrmann ............ 384/606 X |
| 2,891,828 | 6/1959 | Winchell ............ 358/621 |
| 3,309,156 | 3/1967 | Eckstein ............ 384/572 |
| 3,414,341 | 12/1968 | Murphy ............ 384/606 |
| 3,674,356 | 7/1972 | Zeneski ............ 384/470 |
| 3,700,299 | 10/1972 | Batt ............ 384/564 |
| 4,968,157 | 11/1990 | Chiba ............ 384/620 X |
| 5,263,799 | 11/1993 | Sakaguchi et al. ............ 384/470 |

FOREIGN PATENT DOCUMENTS

| | | |
|---|---|---|
| 1969389 | 5/1967 | Germany . |
| 2057620 | 5/1972 | Germany . |
| 2314464 | 10/1974 | Germany . |
| 2934602A1 | 3/1980 | Germany . |
| 3643584A1 | 8/1987 | Germany . |
| 3821613A1 | 12/1989 | Germany . |
| 9003461U1 | 7/1990 | Germany . |
| 4216055A1 | 11/1993 | Germany . |
| 9400643 | 4/1994 | Germany . |
| 4328399A1 | 3/1995 | Germany . |
| 4332032A1 | 3/1995 | Germany . |

*Primary Examiner*—Thomas R. Hannon
*Attorney, Agent, or Firm*—Henry M. Feiereisen

[57] ABSTRACT

An axial rolling bearing includes a cage having pockets for retaining rolling elements between two plane-parallel bearing disks for forming a structural unit through interlocking engagement. At least one bearing disk exhibits a peripheral edge which is turned in to form an axial collar which surrounds the cage with clearance and extends towards a radial plane of the other bearing disk to form at least one annular gap. The cage is provided in an area of the annular gap with through-bores which are radially spaced from the pockets and are defined by a diameter, with the annular gap having a radial dimension which is equal or greater than the diameter of the through-bores.

6 Claims, 1 Drawing Sheet

AXIAL ROLLING BEARING

CROSS-REFERENCES TO RELATED APPLICATIONS

This application claims benefit of prior filed provisional application Appl. No. 60/006,928, filed Nov. 17, 1995, now abandoned.

BACKGROUND OF THE INVENTION

The present invention refers to an axial rolling bearing, and in particular to an axial rolling bearing of a type including a cage having pockets for retaining rolling elements between two plane-parallel bearing disks for exhibiting a structural unit through interlocking engagement, with at least one bearing disk having a peripheral edge which is turned in to form an axial collar that surrounds the cage with clearance and extends towards a radial plane of the other one of the bearing disks to form at least one annular gap.

Such an axial rolling bearing is known from U.S. Pat. No. 2,891,828 and is used particularly in torque converters of automotive transmissions. A drawback of this conventional bearing is the necessity for the lubricant to overcome a considerable flow resistance in order to be able to pass through the axial rolling bearing. This resistance to lubricant flow is caused not only by the narrow radial and axial gaps between the bearing disks and the cage but also by the narrow spaces between the rolling elements and the pockets of the cage.

SUMMARY OF THE INVENTION

It is an object of the present invention to provide an improved axial rolling bearing, obviating the afore-stated drawbacks.

In particular, it is an object of the present invention to provide an improved axial rolling bearing which allows through-flow of lubricant without exhibiting significant resistance.

These objects and others which will become apparent hereinafter are attained in accordance with the present invention by providing the cage in the area of the annular gap with through-bores at a radial distance from the pockets, with the annular gap having a radial dimension which at least equals the diameter of the through-bores, The arrangement of the annular gap and the through-bores permits an unrestricted penetration of the lubricant into the bearing.

According to a further feature of the invention, also the other one of the bearing disks exhibits a peripheral edge which is turned in to form an axial collar which surrounds the cage with clearance and extends towards a radial plane of the one bearing disk to form a further annular gap which is positioned diametrically opposite to the first-mentioned annular gap and is defined by a surface area which corresponds at least to the total surface area of the through-bores. Thus, it is ensured that the lubricant does not encounter any resistance when exiting the bearing.

According to a further feature of the present invention, some pockets of the cage remain empty and do not receive any rolling elements. Lubricant can thus flow through the bearing via these empty pockets so that the narrow radial and axial gaps between the cage and the bearing disks, on the one hand, and the narrow spaces between the rolling elements and the pockets, on the other hand, are divested of their flow resistance-increasing character. Advantageously, only every other pocket of the cage retains a rolling element.

Thus, by using empty pockets as passageway, the lubrication and the flow of lubricant through the bearing is optimized. Of course, persons skilled in the art will understand that the number of empty pockets that are devoid of rolling elements may be reduced depending on the load-carrying capability of the bearing.

According to yet another feature of the present invention, the cage may be configured in form of a Sigma, as viewed in longitudinal section, and has inner and outer peripheral surfaces that are formed with turned in edges for guidance in radial direction upon the collars of the bearing disks. It is noted, however, that the present invention should not be limited to this type of cage configuration. Any cage configuration that is formed with through-bores in the area of the annular gap should be considered within the scope of the present invention.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 2:
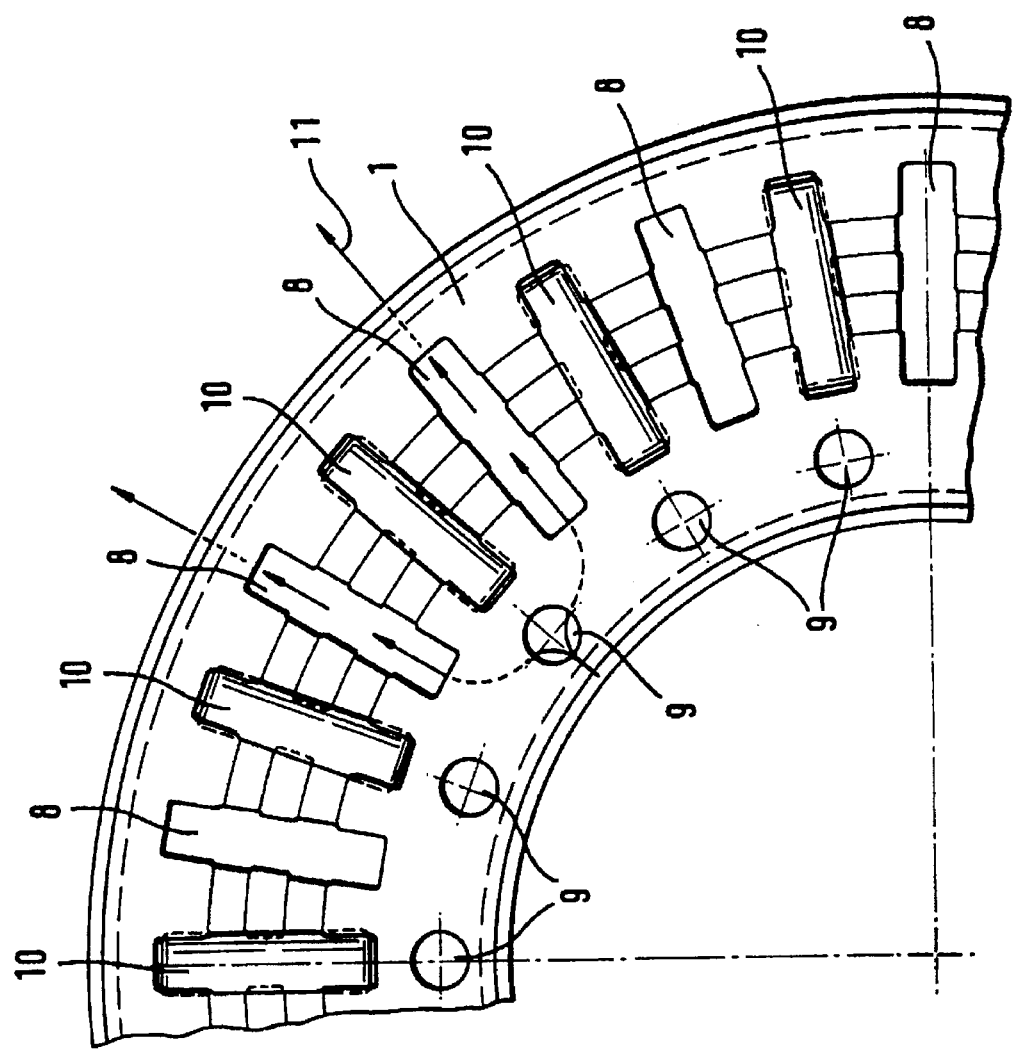
FIG. 2 is a fragmentary top view of a cage for use in the axial rolling bearing of FIG. 1.

Throughout all the Figures, the same or corresponding elements are always indicated by the same reference numerals.

Figure 1:
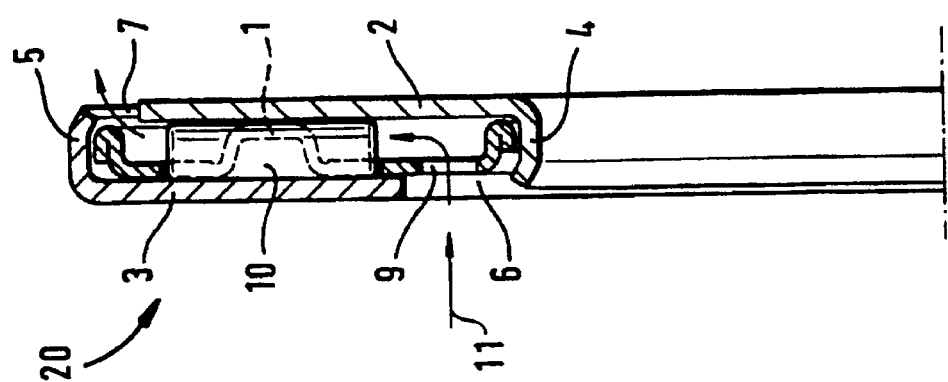
FIG. 1 is a partially longitudinal section of one embodiment of an axial rolling bearing according to the present invention.

Turning now to the drawing, and in particular to FIG. 1, there is shown a partial longitudinal section of one embodiment of an axial rolling bearing according to the present invention, generally designated by reference numeral 20 and including a cage 1 which extends between two plane-parallel bearing disks 2, 3 made preferably of sheet metal. The cage 1 is provided with a plurality of circumferentially spaced pockets 8 for retaining rolling elements 10.

The bearing disk 2 is provided with an inner peripheral edge that is turned in to form an axial collar 4. Likewise, the bearing disk 3 is provided with an outer peripheral edge that is turned in to form an axial collar 5 so that two diametrically opposed annular gaps 6, 7 are formed. The collars 4, 5 of the bearing disks 2, 3 extend around the cage 1 so that the cage 1 and the bearing disks 2, 3 are connected to each other in interlocking manner to form a captivated structural unit.

In the area of the annular gap 6, the cage 1 is formed with through-bores 9 that are located radially inwards of the pockets 8 whereby the annular gap 6 has a radial dimension which at least equals the diameter of the through-bores. In the non-limiting example of FIG. 1, the through-bores 9 have a diameter that is slightly smaller than the radial dimension of the annular gap 6.

As shown in FIG. 2 by way of example only, some of the pockets 8 are empty and thus devoid of any rolling elements 10. According to a preferred embodiment, only every other pocket 8 is occupied by a rolling element 10, with the through-bores 9 being positioned radially inwards of those pockets 8 that retain a rolling element 10.

As viewed in longitudinal section, the cage 1 is configured substantially of Sigma shape and has inner and outer peripheries exhibiting turned in edges which bear against the collars 4, 5, respectively, at formation of radial annular gaps.

The annular gap 7 which is defined by the bearing disk 3 and the axial collar 5 exhibits a slightly smaller radial dimension than the radial dimension of the annular gap 6 but is still within the order of magnitude of the diameter of the through-bores 9.

The flow path of the lubricant through the axial rolling bearing 20 is schematically indicated in FIGS. 1 and 2 by arrows 11, and it can be seen that the lubricant enters the bearing 20 through the annular gap 6 and after flowing through the through-bores 9 is divided, as indicated in FIG. 2, to traverse the rolling bearing 20 in radial direction through the empty pockets 8. The lubricant exits the rolling bearing through the annular gap 7 defined between the bearing disk 2 and the collar 5 of the bearing disk 3.

The configuration of the axial rolling bearing 20 in accordance with the present invention enables lubricant to bypass the constricting radial gaps between the cage 1 and the collars 4, 5 and the axial gaps between the cage 1 and the bearing disks 2, 3. The annular gaps 6, 7, the through-bores 9 and the empty pockets 8 ensure an unrestricted flow of lubricant through the rolling bearing 20.

While the invention has been illustrated and described as embodied in an axial rolling bearing, it is not intended to be limited to the details shown since various modifications and structural changes may be made without departing in any way from the spirit of the present invention.

What is claimed as new and desired to be protected by Letters Patent is set forth in the appended claims:

We claim:

1. An axial rolling bearing, comprising a cage having pockets for retaining rolling elements between two plane-parallel bearing disks, with the cage forming with the rolling elements and the bearing disks a structural unit through interlocking engagement, wherein at least a first one of said bearing disks exhibits a peripheral edge which is turned in to form an axial collar that surrounds the cage with clearance and extends towards a radial plane of the second one of the bearing disks to form at least one annular gap defined by a radial dimension, said cage being formed in an area of the annular gap with through-bores which are radially spaced from the pockets and are defined by a diameter, wherein the annular gap has a radial dimension which at least equals the diameter of the through-bores.

2. The axial rolling bearing of claim 1 wherein the second bearing disk exhibits a peripheral edge which is turned in to form an axial collar that surrounds the cage with clearance and extends towards a radial plane of the first bearing disk to form a further annular gap defined by an area which corresponds at least to the total surface area of the through-bores.

3. The axial rolling bearing of claim 1 wherein at least some pockets of the cage are empty and devoid of retaining any rolling elements.

4. The axial rolling bearing of claim 1 wherein every other pocket of the cage retains a rolling element.

5. The axial rolling bearing of claim 1 wherein the cage is of Sigma-shaped configuration, as viewed in longitudinal section, and has inner and outer peripheral surfaces formed with turned in edges for guidance in radial direction upon the collars of the bearing disks.

6. The axial rolling bearing of claim 1 wherein the bearing disks are made of sheet metal.

* * * * *